United States Patent [19]

Winnacker

[11] 4,184,758

[45] Jan. 22, 1980

[54] DEEP SEA UNDERWATER CAMERA

[75] Inventor: Helmut Winnacker, Burgdorf, Fed. Rep. of Germany

[73] Assignee: Preussag Aktiengellschaft, Fed. Rep. of Germany

[21] Appl. No.: 835,437

[22] Filed: Sep. 22, 1977

[30] Foreign Application Priority Data

Dec. 14, 1976 [DE] Fed. Rep. of Germany ....... 2656516

[51] Int. Cl.$^2$ ............................................ G03B 17/08
[52] U.S. Cl. .................................................... 354/64
[58] Field of Search ............. 354/64; D16/2; 350/61, 350/67; 2/21 R; 405/186, 187, 189; 114/16 R; 352/242

[56] References Cited

U.S. PATENT DOCUMENTS

| | | | |
|---|---|---|---|
| 3,065,666 | 11/1962 | Sampson | 354/64 |
| 3,261,274 | 7/1966 | Smith | 354/64 |
| 4,035,816 | 7/1977 | Winnacker | 354/64 |

Primary Examiner—L. T. Hix
Assistant Examiner—William B. Perkey
Attorney, Agent, or Firm—Allegretti, Newitt, Witcoff & McAndrews

[57] ABSTRACT

An underwater camera for deep sea use having a cylindrical pressure-tight housing including a thickened cylindrical bead arranged eccentrically of the housing to define an area on one side of the housing which is thicker than the opposite side of the housing, and a window in the thicker area for exposing the film in the camera.

4 Claims, 2 Drawing Figures

DEEP SEA UNDERWATER CAMERA

BACKGROUND AND SUMMARY OF THE INVENTION

The present invention relates to an underwater camera for deep sea use, comprising a pressure-tight and substantially cylindrical housing enclosing a camera, the wall of said housing having, in the region of the camera objective, a thickened portion in which is disposed a window opposite the objective.

In U.S. Pat. No. 3,261,274 an underwater camera is disclosed which operates in conjunction with a grab which is suspended from a cable and is lowered onto the sea bed. The camera comprises a pressure-tight, cylindrical housing, which is arranged with the axis of the cylinder substantially vertical. The housing is made pressure-tight and encloses a camera which looks downward through a window arranged on the bottom end wall. The arrangement of the window in the end wall necessitates a housing of considerable dimensions. If this housing is to withstand high sea pressures, it must have extraordinarily thick walls, which results in the weight being high. A high weight is of no great significance with that camera, because it is used in conjunction with a grab hanging on a cable.

In German Auslegeschrift No. 1,911,782 a free-fall grab is disclosed which comprises buoyancy members consisting of glass spheres, which are arranged one above the other. The uppermost glass sphere is separable and contains a camera which looks outwardly and obliquely through the glass sphere onto the sea bed. Therefore, the glass sphere not only serves as a buoyancy member for the free-fall grab, but also as a pressure-tight housing for the camera. An important disadvantage of this arrangement consists in that special measures are necessary for avoiding distortion of the picture because of the spherical wall of the glass sphere. Moreover, an initial condition for the arrangement is the use of glass for the pressure-tight housing of the camera. Considerable disadvantages arise as a consequence, more especially when it is intended that the camera with the housing should be made particularly small, so that they can be accommodated together with the pressure-tight housing by the free-fall grab.

The present invention has for its object an underwater camera for deep sea use, where the pressure-tight housing can be made particularly small and which can be constructed of a non-transparent material, such as aluminum. In addition, the underwater camera of the present invention can be particularly light in weight and suitable for being fitted on free-fall grabs.

These objects of the present invention are achieved by a thickening of the housing comprising a cylindrical bead which is arranged eccentrically of the cylindrical housing and which projects over the window of the camera.

In a preferred embodiment of camera incorporating the principles of the present invention, a cylindrical pressure-tight housing as previously known is provided which, however, has a window arranged in the cylindrical wall. This positioning of the window requires a considerable wall thickness for transmitting the pressure of the window to the surrounding marginal portions of the opening for the window in the housing. However, a large wall thickness would result in considerable weight. The present invention avoids this disadvantages of excessive weight by the cylinder wall only being thicker in the region in which the window is situated, which thickness may be produced by simple machining, e.g. turning operation, the latter of which is also suitable for producing the remainder of the high pressure-tight housing itself.

A further feature of the invention consists in that the bead is flush with the cylindrical external surface of the housing on the side of the housing furthest from the window. The result of this construction is that the cylinder wall has its maximum thickness, such as is necessary for accommodating the window, only in the region of the latter, while in the region furthest from the window, it only has the thickness which is provided for the housing wall generally.

It is desirable for the side walls of the increased thickness bead to be bevelled. The intended purpose of such bevel is that a constant transition between the different wall thickness will result such that stress peaks in the material are avoided.

Due to the above features of the present invention, the housing of the underwater camera of the present invention can be made extremely small and light in weight. When being used in conjunction with free-fall grabs, the useful load of the latter can therefore be increased by an amount corresponding to the reduction in weight of the camera.

These and other objects, features and advantages of the present invention will be more clearly understood through a consideration of the following detailed description.

BRIEF DESCRIPTION OF THE DRAWING

In the course of this description, reference will frequently be made to the attached drawing in which.

DESCRIPTION OF THE PREFERRED EMBODIMENT

Figure 1:
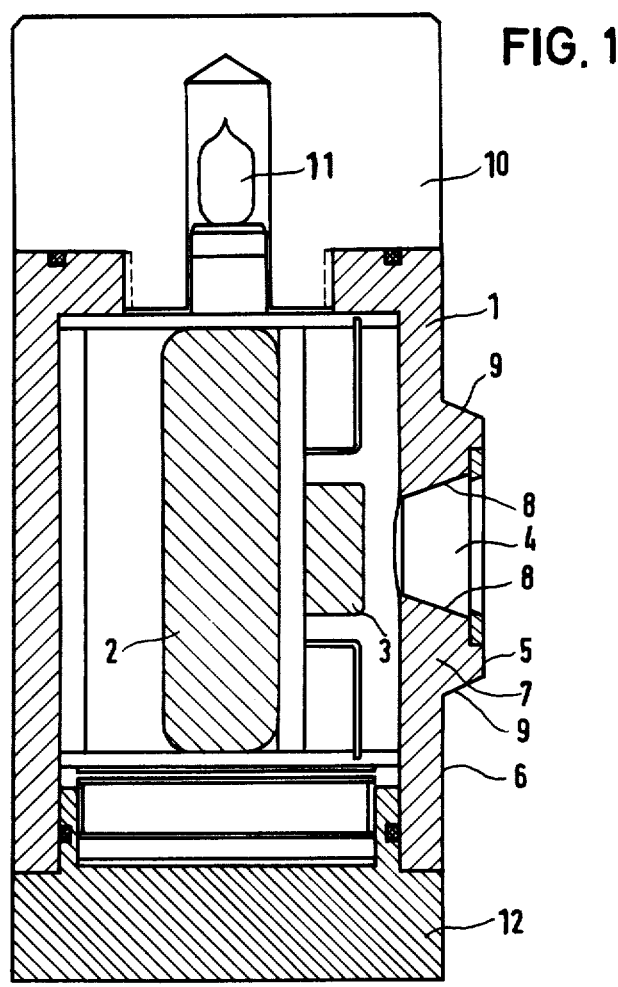
FIG. 1 is a cross-sectioned elevation view of an underwater camera for deep sea use constructed in accordance with the principles of the invention.

In FIG. 1, a camera 2 is shown positioned in a substantially cylindrical housing 1, the objective 3 of said camera, looking outwardly through a window 4 formed by pressure-resistant glass.

The window 4 is arranged in the region of a thickened bead 5, which is raised outwardly from the cylindrical wall 6 of the housing 1, thus forming a reinforcement 7 which is able to absorb the forces exerted by the sea pressure on window 4 and these forces are transmitted to the housing by sloping surfaces 8 of the window 4. The transition between the thickened bead 5 and the cylindrical wall 6 is achieved by bevelled side surfaces 9.

Arranged on one axial end surface of the housing 1, is a transparent cap 10, in which is disposed a flash lamp 11, which serves to illuminate the sea bed for the purpose of the photographic exposure. At the other end, the housing 1 is closed by a fitted cover 12. The release of the camera at the sea bed is effected by means which are not shown, but which may be of the type disclosed in German application Ser. No. P 26 50 524.8, filed Nov. 4, 1976.

Figure 2:
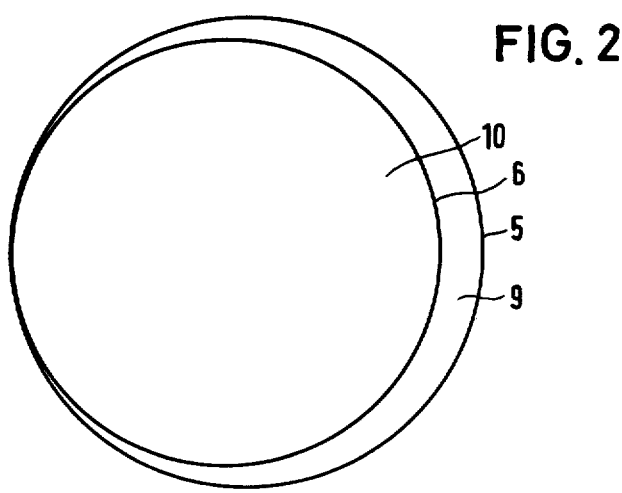
FIG. 2 is an end view of the underwater camera shown in FIG. 1.

FIG. 2 is a plan view of the camera housing as viewed axially downward from the cap 10 shown in FIG. 1. The eccentric position of the bead 5 in relation to the cylindrical wall 6 of the housing can be clearly seen in FIG. 2. The transition between the bead and housing surfaces is formed by the bevelled side surface 9. The window 4 is not visible in FIG. 2. On the side remote from the window 4, which is on the left in FIG. 2, the external surfaces of the bead 5 and of the cylindrical wall 6 are flush with each other, so that the wall in that location, is not thickened, as can also be clearly seen in FIG. 1.

It will be understood that the embodiment of the present invention which has been described is merely illustrative of one of the applications of the principles of the invention. Numerous modifications may be made by those skilled in the art without departing from the true spirit and scope of the invention.

What is claimed is:

1. An underwater camera housing for deep sea use comprising, a pressure-tight, substantially cylindrical housing for enclosing a camera therein, a thickened cylindrical bead on the cylindrical surface of said cylindrical housing, said bead being arranged eccentrically of said cylindrical housing to define an area on one side of said housing which is thicker than the opposite side of said housing, and a window opening through said housing and being located adjacent the objective of the camera when said camera is positioned in said housing and in said thicker area of said bead for exposing the film in said camera.

2. The camera housing of claim 1 wherein said bead is flush with the cylindrical surface of said cylindrical housing opposite said window.

3. The camera housing of claim 1 wherein said bead includes bevelled surfaces extending between the exterior surfaces of said bead and said cylindrical housing.

4. The camera housing of claim 1 wherein said window includes sloping surfaces which rest upon complementary sloping surfaces on said bead.

* * * * *